US008814026B2

United States Patent
Kato

(10) Patent No.: US 8,814,026 B2
(45) Date of Patent: Aug. 26, 2014

(54) FRICTION STIR WELDING APPARATUS

(75) Inventor: Yoshinori Kato, Tokyo (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 0 days.

(21) Appl. No.: 13/347,871

(22) Filed: Jan. 11, 2012

(65) Prior Publication Data

US 2012/0298304 A1 Nov. 29, 2012

(30) Foreign Application Priority Data

May 27, 2011 (JP) ................................ 2011-119213

(51) Int. Cl.
*B23K 20/12* (2006.01)

(52) U.S. Cl.
USPC .......... 228/2.1; 228/113; 228/114; 228/112.1

(58) Field of Classification Search
USPC ................................ 228/112.1, 113, 114, 2.1
See application file for complete search history.

(56) References Cited

U.S. PATENT DOCUMENTS

| 3,208,229 | A | * | 9/1965 | Fulton | ............................. | 62/5 |
| 5,349,778 | A | * | 9/1994 | Chu | .............................. | 43/124 |
| 2007/0228104 | A1 | * | 10/2007 | Mankus et al. | ................ | 228/101 |
| 2010/0072261 | A1 | * | 3/2010 | Cruz et al. | ..................... | 228/102 |
| 2010/0176182 | A1 | * | 7/2010 | Hanlon et al. | ................. | 228/2.1 |

FOREIGN PATENT DOCUMENTS

| JP | 58-168855 | 10/1983 |
| JP | 2-24040 | 1/1990 |
| JP | 4-60323 | 2/1992 |
| JP | 06-081800 | 3/1994 |
| JP | 7-290345 | 11/1995 |
| JP | 10-052770 | 2/1998 |
| JP | 2000-202645 | 7/2000 |
| JP | 2004-050234 | 2/2004 |
| JP | 2004-148350 | 5/2004 |
| JP | 2004-154790 | 6/2004 |
| JP | 2004-253492 | 9/2004 |
| JP | 2006-102748 | 4/2006 |
| JP | 2007-144458 | 6/2007 |
| JP | 2008-73694 | 4/2008 |

OTHER PUBLICATIONS

Japanese Notice of Allowance, with English translation, issued Dec. 20, 2013 in Japanese Patent Application No. 2011-119213.

* cited by examiner

*Primary Examiner* — Erin Saad
(74) *Attorney, Agent, or Firm* — Wenderoth, Lind & Ponack, L.L.P.

(57) ABSTRACT

A friction stir welding includes a main body for holding a tool and a hot air and cool air separating unit. The separating unit is disposed at the main body and separates a supplied gas into hot air hotter than the gas and cool air cooler than the gas in a tube portion and ejects the cool air from a first end of the tube portion and ejects hot air from a second end of the tube portion. The hot air is supplied to a front side of a movement direction of the tool in the surface of the work piece from a tool side of the friction stir welding apparatus and the cool air is supplied to a rear side of the movement direction of the tool in the surface of the work piece from the tool side of the friction stir welding apparatus.

10 Claims, 8 Drawing Sheets

US 8,814,026 B2

FRICTION STIR WELDING APPARATUS

BACKGROUND OF THE INVENTION

Field of the Invention

The present invention relates to a friction stir welding apparatus that performs friction stir welding on a work piece. Priority is claimed on Japanese Patent Application No. 2011-119213, filed May 27, 2011, the content of which is incorporated herein by reference.

As one method of welding a work piece formed of two members, friction stir welding is known. The friction stir welding indicates that a tool is rotated while a surface called a shoulder surface of the tool is pressed with a predetermined pressure against a welding position of the work piece so as to generate friction heat in the surface of the work piece and the work piece is softened and welded by the friction heat.

As such friction stir welding, for example, JP-A-10-52770 discloses a technique of spraying a cooling agent such as liquid or air to a tool so as to perform satisfactory welding by removing excessive heat caused by the friction.

Further, for example, JP-A-2004-148350 discloses a technique of preventing a thermal defect in a manner such that a front side of a tool movement direction in a work piece is pre-heated so as to smoothly friction-stir the work piece with a high melting point and a rear side of the tool movement direction in the work piece is cooled so as to remove excessive heat. In this method, a refrigerant such as dry ice, ethanol, and low-temperature air is used so as to cool the work piece.

[Patent Document 1]: Japanese Patent Application Laid-Open No. 10-52770
[Patent Document 2]: Japanese Patent Application Laid-Open No. 2004-253492

SUMMARY OF THE INVENTION

In the techniques disclosed in JP-A-10-52770 and JP-A-2004-148350, a cooling agent or refrigerant is separately needed so as to cool the rear side of the tool movement direction and also spraying means for spraying the cooling agent or the like is needed, which leads to a problem in that the installation cost increases.

Furthermore, in the technique disclosed in JP-A-2004-148350, since heating means for pre-heating the work piece is separately needed in addition to the means for cooling the work piece, the installation cost further increases, which is not desirable from the economic viewpoint.

The present invention is made in view of the above-described problems, and it is an object of the present invention to provide a friction stir welding apparatus capable of cheaply and easily heating or cooling a work piece.

In the present invention, in order to attain the above-described object, the following means is adapted.

That is, according to an aspect of the present invention, there is provided a friction stir welding apparatus which performs friction stir welding on a work piece by bringing a tool into contact with a surface of the work piece and rotating and moving the tool about the axis thereof, the friction stir welding apparatus including: a hot air and cool air separating unit which separates a supplied gas into hot air hotter than the gas and cool air cooler than the gas and ejects the hot and cool air, wherein at least one of the hot air and the cool air is supplied to the surface of the work piece.

According to the friction stir welding apparatus with such characteristics, the supplied gas may be separated into the hot air and the cool air by the hot air and cool air separating unit. Thus, it is possible to easily heat or cool the work piece by supplying the hot air or the cool air to the surface of the work piece.

Further, in the friction stir welding apparatus according to the aspect of the present invention, the hot air may be supplied to the front side of the movement direction of the tool in the surface of the work piece, and the cool air may be supplied to the rear side of the movement direction of the tool in the surface of the work piece.

Accordingly, even when independent heating means or independent cooling means is not separately provided, it is possible to cheaply and easily remove excessive heat generated after the pre-heating or the processing of the work piece by using the hot air and the cool air which are simultaneously generated from the single hot air and cool air separating unit.

Furthermore, in the friction stir welding apparatus according to the aspect of the present invention, the hot air and cool air separating unit may include a tube portion of which one end is provided with a hot air ejection port capable of ejecting the hot air, a vortex flow generating portion which is connected to the other end of the tube portion and rotates the gas supplied from the outside in a vortex shape so as to be sent to one end side inside the tube portion and of which the other end is provided with a cool air ejection port capable of ejecting the cool air, a pressure adjusting valve which is capable of adjusting the pressure of the gas supplied into the vortex flow generating portion, and a flow rate adjusting valve which is capable of adjusting the flow rate of the hot air ejected from the hot air ejection port.

Accordingly, it is possible to reliably generate the hot air and the cool air from the supplied gas by using the hot air and cool air separating unit. That is, the gas which is supplied to the vortex flow generating portion of the hot air and cool air separating unit rotates in a vortex shape inside the vortex flow generating portion so as to become the first rotating vortex flow, and which is sent to the tube portion. The first rotating vortex flow moves to one end side of the tube portion while pressing the inner peripheral surface of the tube portion by the centrifugal force in the form of the second rotating vortex flow inside the tube portion. Then, the air flow which is not discharged to the outside from the hot air discharge port by the flow rate adjusting valve in the second rotating vortex flow is reversed in the movement direction and enters a low-pressure area inside the second rotating vortex flow so as to move to the other end side. Then, a force is applied from the outer second rotating vortex flow to the inner air flow so as to rotate, so that it rotates in a vortex shape and the third rotating vortex flow is generated. At this time, since a heat exchange is actively performed between the outer second rotating vortex flow and the inner third rotating vortex flow, heat is transferred from the third rotating vortex flow to the second rotating vortex flow. Accordingly, the air flow which passes through the flow rate adjusting valve in the second rotating vortex flow is ejected as the hot air from the hot air ejection port, and the third rotating vortex flow is ejected as the cool air from the cool air ejection port. In this way, the hot air and cool air separating unit separates the supplied gas into the hot air and the cool air and ejects the separated air.

In the hot air and cool air separating unit, the difference in temperature between the hot air and the cool air is widened as the pressure of the gas supplied from the outside to the vortex flow generating portion becomes smaller. Thus, it is possible to easily adjust the difference in temperature between the hot air and the cool air by adjusting the pressure adjusting valve.

Further, in the hot air and cool air separating unit, the difference in temperature between the hot air and the cool air is widened as the flow rate of the cool air which is ejected from the cool air ejection port becomes larger. Thus, when the flow rate of the hot air which is ejected from the hot air ejection port is adjusted by the flow rate adjusting valve, the flow rate of the cool air which is ejected from the cool air ejection port may be also adjusted. Accordingly, it is possible to easily adjust the difference in temperature between the hot air and the cool air by adjusting the flow rate adjusting valve.

Further, the friction stir welding apparatus according to the aspect of the present invention may further include a torque detecting unit which detects a rotational torque about the axis of the tool; and a first control device which controls at least one of the pressure adjusting valve and the flow rate adjusting valve on the basis of the value of the rotational torque detected by the torque detecting unit.

Accordingly, it is possible to adjust the temperatures of the hot air and the cool air which are sprayed to the work piece by controlling the pressure adjusting valve or the flow rate adjusting valve in accordance with the rotational torque of the tool.

For example, in the case of the work piece with a great high-temperature strength, the pressure adjusting valve or the flow rate adjusting valve is controlled so that the temperature of the hot air supplied to the surface of the work piece rises when the rotational torque is larger than a specified value. Accordingly, since it is possible to reduce the rotational torque by softening the welded portion of the work piece, it is possible to obtain a uniform welded state.

Further, for example, in the case of the work piece with a low high-temperature strength, the pressure adjusting valve or the flow rate adjusting valve is controlled so that the temperature of the cool air supplied to the surface of the work piece falls when the rotational torque is lower than a specified value. Accordingly, it is possible to prevent the welding portion of the work piece from being excessively softened and prevent a defect from being caused by the excessive stirring.

Furthermore, the friction stir welding apparatus according to the aspect of the present invention may further include a reaction force detecting unit which detects a tool reaction force in the direction along the axis and exerted on the tool from the work piece; and a second control device which controls at least one of the pressure adjusting valve and the flow rate adjusting valve on the basis of the value of the tool reaction force detected by the reaction force detecting unit.

Accordingly, it is possible to adjust the temperatures of the hot air and the cool air sprayed to the work piece by controlling the pressure adjusting valve or the flow rate adjusting valve in accordance with the tool reaction force.

That is, for example, in the case of the work piece with a great high-temperature strength, the pressure adjusting valve or the flow rate adjusting valve is controlled so that the temperature of the hot air supplied to the surface of the work piece rises when the tool reaction force is larger than a specified value.

Accordingly, it is possible to reduce the tool reaction force by softening the welding portion of the work piece and obtain the uniform welded state.

Further, for example, in the case of the work piece with a low high-temperature strength, the pressure adjusting valve or the flow rate adjusting valve is controlled so that the temperature of the cool air supplied to the surface of the work piece falls when the tool reaction force is smaller than a specified value.

Accordingly, it is possible to prevent the welding portion of the work piece from being excessively softened and prevent a defect from being caused by the excessive stirring.

According to the friction stir welding apparatus of the present invention, since it is possible to simultaneously generate the hot air and the cool air from the supplied gas through the single hot air and cool air separating unit, it is possible to cheaply and easily heat or cool the work piece.

DETAILED DESCRIPTION OF THE INVENTION

Hereinafter, exemplary embodiments of the present invention will be described by referring to the accompanying drawings.

Figure 1:
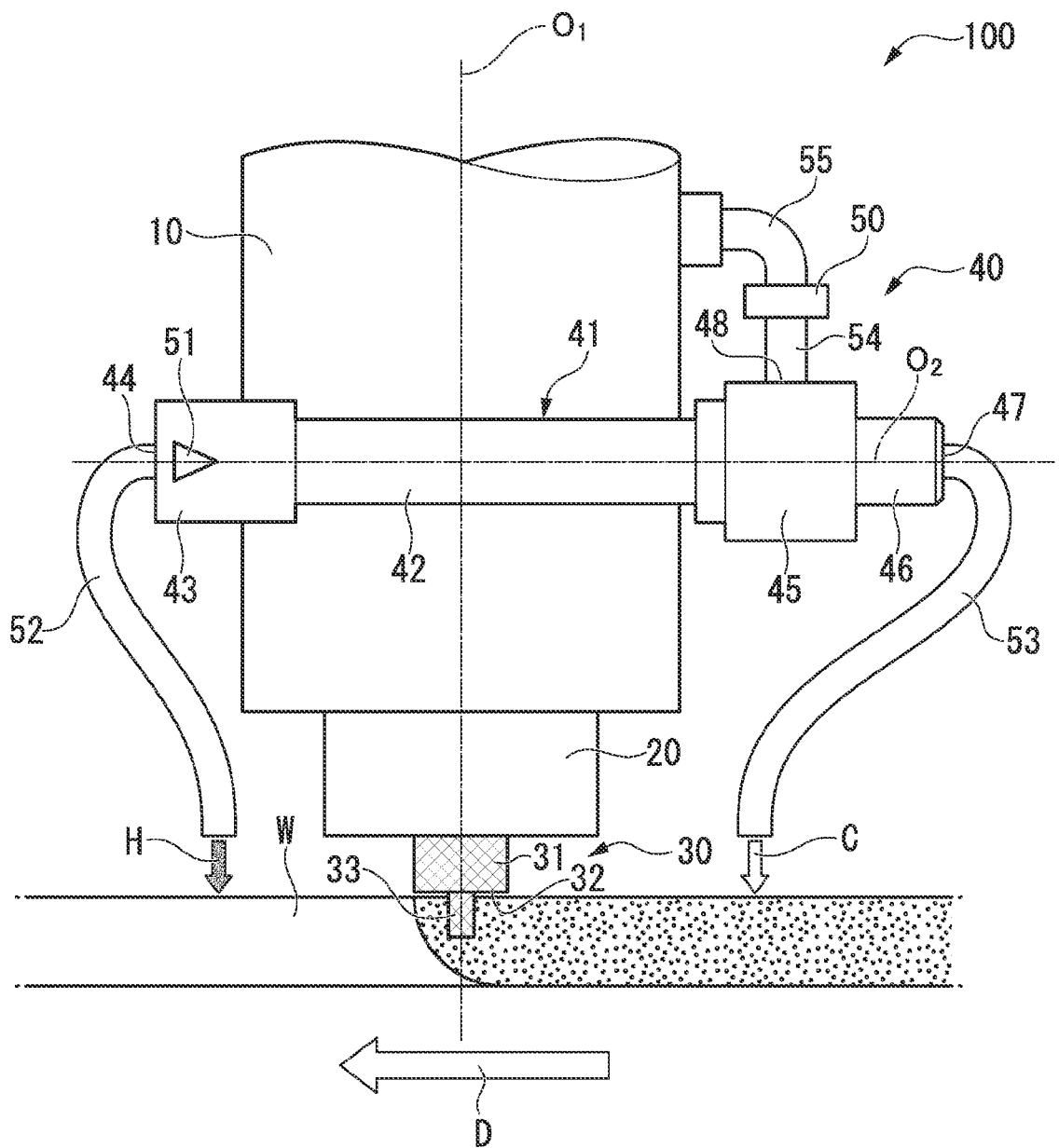
FIG. 1 is a side view illustrating the overall configuration of a friction stir welding apparatus according to a first embodiment of the present invention.

As shown in FIG. 1, a friction stir welding apparatus 100 of the embodiment is an apparatus that welds a work piece W by friction stir welding. In the description below, an example in which welding end surfaces of the work piece W formed as a pair of sheet-like members are welded to each other by the friction stir welding apparatus 100 will be described.

The friction stir welding apparatus 100 is mounted on a main shaft of a processing machine (not shown), and includes a main body 10, a tool holding unit 20 which is supported by the main body 10, a tool 30 which is integrally held by the tool holding unit 20, and a vortex tube (a hot air and cool air separating unit) 40 which is capable of ejecting hot air H and cool air C.

The main body 10 is disposed near the surface of the work piece W with a gap between the main body and the work piece W, and is formed in a cylindrical shape about the axis $O_1$ which is perpendicular to the extension direction (the horizontal direction) of the work piece W. The main body 10 is configured to be arbitrarily movable in the direction along the axis $O_1$ (the vertical direction) and the direction along the surface of the work piece W (the horizontal direction) with the movement of the main shaft of the processing machine.

The main shaft of the processing machine is configured to be movable in the horizontal direction, that is, the XY directions by the driving of, for example, an X-axis motor and a Y-axis motor (which are not shown), and is also configured to be movable in the vertical direction by a Z-axis motor (which is not shown). When the friction stir welding is performed, the X-axis motor or the Y-axis motor is driven, so that the main body 10 moves in a predetermined movement direction D along the surface of the work piece W, that is, the horizontal plane.

The tool holding unit 20 is formed in a columnar shape about the axis $O_1$, and is coaxially disposed with the main body 10 so as to be inserted into the main body 10. The downside portion of tool holding unit 20 (one side portion in the direction along the axis $O_1$) protrudes further downward in relation to the main body 10. Further, the tool holding unit 20 is configured to be rotatable relative to the main body 10 about the axis $O_1$, and the tool holding unit 20 is configured to be rotationally driven about the axis $O_1$ with the rotation of the main shaft of the processing machine. That is, in the embodiment, the main body 10 is fixed so that rotation thereof is not allowed, and only the tool holding unit 20 is configured to rotate about the axis $O_1$.

The main shaft of the processing machine is configured to be rotationally driven by a rotation motor (not shown), and the tool holding unit 20 rotates about the axis $O_1$ with the rotation of the main shaft of the rotation motor.

The tool 30 includes a shoulder portion 31 and a shaft portion 33 which are formed about the axis $O_1$ and are integrally formed with each other.

The shoulder portion 31 is formed in a columnar shape about the axis $O_1$, and the end of the upside (the other side in the direction along the axis $O_1$) is integrally fixed to the lower end of the tool holding unit 20. Further, the lower end surface of the shoulder portion 31 is disposed near the surface of the work piece W and is formed as a shoulder surface 32 which presses the surface.

The outer shape of the shaft portion 33 is formed so as to be smaller than that of the shoulder, and the shaft portion is formed in a columnar shape which protrudes downward from the center of the shoulder surface 32.

Next, the vortex tube 40 will be described by referring to FIGS. 1 and 2.

Figure 2:
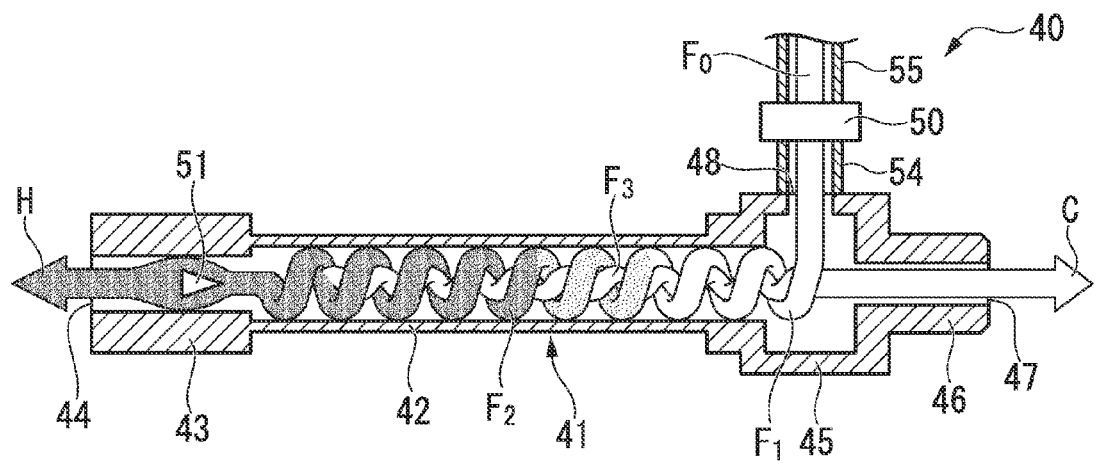
FIG. 2 is a longitudinal sectional view illustrating a vortex tube (a hot air and cool air separating unit).

The vortex tube 40 includes a tube main body 41, a pressure adjusting valve 50, a flow rate adjusting valve 51, a hot air hose 52 (not shown in FIG. 2), and a cool air hose 53 (not shown in FIG. 2).

The tube main body 41 is a member which is formed along the center line $O_2$, where the portion of one end side (the left side in FIGS. 1 and 2) is formed as a tube portion 42 and the portion of the other end side (the right side of FIGS. 1 and 2) is formed as a vortex flow generating portion 45.

The tube portion 42 is formed as a circular tube shape which extends in the direction along the center line $O_2$ by a predetermined dimension, and one end side thereof is provided with a hot air ejection port 44 which is capable of ejecting the hot air H. In the embodiment, one end side of the tube portion 42 is integrally provided with a first cylindrical portion 43 which is smaller than the inner diameter by one level and is larger than the outer diameter by one level in the tube portion 42, and the opening at the one end side of the first cylindrical portion 43 is formed as the hot air ejection port 44.

The vortex flow generating portion 45 is formed at the other end side of the tube portion 42 in a cylindrical shape so that the inner peripheral surface and the outer peripheral surface increase in diameter by one level from the tube portion 42. The other end side of the vortex flow generating portion 45 is provided with a cool air ejection port 47 which is capable of ejecting the cool air C. In the embodiment, the other end side of the vortex flow generating portion 45 is provided with a second cylindrical portion 46 which extends further toward the other end side along the center line $O_2$ and communicates the inside and the outside of the vortex flow generating portion 45 with the outside, and the opening at the other end side of the second cylindrical portion 46 is formed as the cool air ejection port 47. Furthermore, the outer diameter of the second cylindrical portion 46 is formed so as to be smaller than the vortex flow generating portion 45, and the inner diameter of the second cylindrical portion 46 is formed so as to be smaller than the inner diameters of the vortex flow generating portion 45 and the tube portion 42.

The vortex flow generating portion 45 is provided with a gas supply port 48 which communicates with the inside and the outside thereof in the radial direction.

The gas supply port 48 is opened in the direction which is aligned with or parallel to the tangential direction of the inner peripheral surface of the vortex flow generating portion 45.

One end of the pressure adjusting valve 50 is connected to the gas supply port 48 of the vortex flow generating portion 45 through the connection tube 54. Further, the other end of the pressure adjusting valve 50 is connected to a gas supply tube 55 to which compressed air (gas) $F_0$ is continuously supplied from a compressed air source (not shown). The compressed air $F_0$ from the compressed air source is supplied from the gas supply port 48 into the vortex flow generating portion 45 through the gas supply tube 55, the pressure adjusting valve 50, and the connection tube 54. Then, the pressure adjusting valve 50 is configured to arbitrarily adjust the pressure of the compressed air $F_0$ which is supplied into the vortex flow generating portion 45. The pressure adjusting valve 50 may be electrically controlled so that the pressure of the compressed air $F_0$ is adjusted or may be manually controlled so that the pressure of the compressed air $F_0$ is adjusted.

As the compressed air $F_0$ from the compressed air source, for example, factory air or the like which is commonly used in a facility of a factory or the like may be used. Further, the gas supply tube 55 of the embodiment is connected to the pressure adjusting valve 50 via the inside of the main body 10.

The flow rate adjusting valve 51 is provided at one end side of the tube portion 42, that is, the inside of the first cylindrical portion 43, and is configured to arbitrarily adjust the flow rate of the air flow which circulates inside the first cylindrical portion 43. The flow rate adjusting valve 51 may be electrically controlled so that the flow rate of the air flow is adjusted or may be manually controlled so that the flow rate of the air flow is adjusted.

As shown in FIG. 1, the hot air hose 52 defines a hot air passage and the cool air hose 53 defines a cool air passage, and the hoses 52 and 53 are tubular members which extend while maintaining an arbitrary shape. The base end of the hot air hose 52 is connected to the hot air ejection port 44 of the tube main body 41, and the base end of the cool air hose 53 is connected to the cool air ejection port 47 of the tube main body 41.

The vortex tube 40 is fixed to the main body 10 by, for example, support means (not shown), and is disposed above the work piece W with a gap between the vortex tube and the work piece W while the center line $O_2$ of the tube main body 41 is aligned with the movement direction D of the friction stir welding apparatus 100. Further, the hot air ejection port 44 of the tube main body 41 is directed to the front side of the movement direction D, and the cool air ejection port 47 is directed to the rear side of the movement direction D. Then, the front end of the hot air hose 52 is directed to the front side position of the movement direction D of the tool 30 in the surface of the work piece W, and the front end of the cool air hose 53 is directed to the rear side position of the movement direction D of the tool 30 in the surface of the work piece W.

Next, the operation of the above-described embodiment will be described.

In the case of performing friction stir welding, the main shaft, the tool holding unit 20, and the tool 30 are moved in the vertical direction by the control of the Z-axis motor, so that the shoulder surface 32 of the tool 30 is brought into contact with the surface of the work piece W. Accordingly, a pressure is applied from the shoulder surface 32 of the tool 30 to the surface of the work piece W. Furthermore, the driving of the Z-axis motor is feed-back controlled so that the shoulder surface 32 of the tool 30 normally comes into contact with the surface of the work piece W regardless of the tool reaction force which is applied upward from the work piece W to the tool 30.

Then, in this state, the rotation motor is driven so that the main shaft, the tool holding unit 20, and the tool 30 rotate about the axis $O_1$, and at least one of the X-axis motor and the Y-axis motor is driven so that the friction stir welding apparatus 100 moves in a predetermined movement direction D. Then, as shown in FIG. 1, friction heat is generated between the shoulder surface 32 and the surface of the work piece W so that the surface is softened, and the softened portion is stirred by the shaft portion 33, whereby the friction stir welding is performed.

When the friction stir welding is performed, as shown in FIG. 2, the compressed air $F_0$ which is supplied to the vortex tube 40 is separated into the hot air H and the cool air C by the vortex tube 40 so as to be supplied to the surface of the work piece W.

That is, since the compressed air $F_0$ which passes through the gas supply tube 55, the pressure adjusting valve 50, and the connection tube 54 and is introduced from the gas supply port 48 into the vortex flow generating portion 45 circulates in a vortex shape in the circumferential direction along the inner peripheral surface inside the vortex flow generating portion 45 since the gas supply port 48 is opened in the direction which is aligned with or parallel to the tangential direction of the inner peripheral surface of the vortex flow generating portion 45. Since the compressed air $F_0$ circulates in the circumferential direction in this way, a first rotating vortex flow $F_1$ which rotates about the center line $O_2$ is generated inside the vortex flow generating portion 45.

Since the first rotating vortex flow $F_1$ circulates so as to be pressed against the inner peripheral surface of the vortex flow generating portion 45 due to the centrifugal force, the first rotating vortex flow is sequentially transferred into the tube portion 42 with the supply of the subsequent compressed air $F_0$ from the outside. That is, the first rotating vortex flow $F_1$ is transferred into the tube portion 42 which has a large diameter among the tube portion 42 and the second cylindrical portion 46 communicating with the inside of the vortex flow generating portion 45.

After the first rotating vortex flow $F_1$ which is generated inside the vortex flow generating portion 45 is transferred into the tube portion 42, the first rotating vortex flow moves to one end side while pressing the inner peripheral surface of the tube portion 42 by the centrifugal force in the form of the second rotating vortex flow $F_2$ inside the tube portion 42. Then, a part of the air flow which forms the second rotating vortex flow $F_2$ is reversed in the flow rate adjusting valve 51 inside the first cylindrical portion 43, enters a low-pressure area inside the second rotating vortex flow $F_2$ in the tube portion 42, and then moves toward the other end side.

At this time, a force is exerted on the inner air flow of the second rotating vortex flow $F_2$ so as to be rotated by the viscosity with the second rotating vortex flow $F_2$. Accordingly, the air flow rotates in the same direction as that of the second rotating vortex flow $F_2$, and moves toward the other end side inside the second rotating vortex flow $F_2$ in the form of a third rotating vortex flow $F_3$. At this time, a heat exchange is performed at the boundary area between the second rotating vortex flow $F_2$ positioned at the outside and the third rotating vortex flow $F_3$ positioned at the inside. That is, heat is transferred from the third rotating vortex flow $F_3$ to the second rotating vortex flow $F_2$.

Accordingly, the temperature of the second rotating vortex flow $F_2$ rises, and the part of the air flow which passes through the flow rate adjusting valve 51 in the second rotating vortex flow $F_2$ is ejected from the hot air ejection port 44 in the form of the hot air H which is hotter than the compressed air $F_0$.

Further, the temperature of the third rotating vortex flow $F_3$ falls, and the third rotating vortex flow is ejected from the cool air ejection port 47 in the form of the cool air C which is cooler than the compressed air $F_0$ after it passes through the inside of the second rotating vortex flow $F_2$ and the first rotating vortex flow $F_1$ and the inside of the second cylindrical portion 46.

The hot air H which is ejected from the hot air ejection port 44 passes through the hot air hose 52 and is supplied to the front side of the movement direction D of the tool 30 in the surface of the work piece W. The work piece W to be subjected to friction stirring is pre-heated by the hot air H. Accordingly, it is possible to smoothly perform friction stirring of the work piece W with a high melting point.

Further, the cool air C which is ejected from the cool air ejection port 47 passes through the cool air hose 53 and is supplied to the rear side of the movement direction D of the tool 30 in the surface of the work piece W. The work piece W subjected to the friction stir welding is cooled by the cool air C. Accordingly, it is possible to prevent a thermal defect by removing the excessive heat of the work piece W after the process.

In the vortex tube 40, it is possible to easily adjust the difference in temperature between the hot air H and the cool air C by adjusting the pressure adjusting valve 50 and the flow rate adjusting valve 51. That is, in the vortex tube 40, the difference in temperature between the hot air H and the cool air C is narrowed as the pressure of the compressed air $F_0$ supplied from the outside of the vortex flow generating portion 45 to the vortex flow generating portion becomes smaller. On the other hand, in the vortex tube 40, the difference in temperature between the hot air H and the cool air C is widened as the pressure of the compressed air $F_0$ supplied from the outside of the vortex flow generating portion 45 to the vortex flow generating portion becomes larger.

Accordingly, it is possible to easily adjust the difference in temperature between the hot air H and the cool air C by adjusting the pressure of the compressed air $F_0$ using the pressure adjusting valve 50.

Further, in the vortex tube 40, the difference in temperature between the hot air H and the cool air C is widened as the flow rate of the cool air C ejected from the cool air ejection port 47 becomes larger. On the other hand, in the vortex tube 40, the difference in temperature between the hot air H and the cool air C is narrowed as the flow rate of the cool air C ejected from the cool air ejection port 47 becomes smaller.

Accordingly, since the flow rate of the cool air C ejected from the cool air ejection port 47 is also adjusted when the flow rate of the hot air H ejected from the hot air ejection port 44 is adjusted by the flow rate adjusting valve 51, it is possible to easily adjust the difference in temperature between the hot air H and the cool air C by adjusting the flow rate adjusting valve 51.

As described above, according to the friction stir welding apparatus 100 of the embodiment, since the supplied compressed air $F_0$ may be separated into the hot air H and the cool air C by the vortex tube 40, it is possible to easily heat or cool the work piece W by supplying the hot air H or the cool air C to the surface of the work piece W.

Further, since it is possible to simultaneously generate the hot air H and the cool air C through the single vortex tube 40 even when independent heating means or independent cooling means is not separately provided, it is possible to easily and cheaply remove excessive heat after the work piece W is pre-heated or processed.

Further, in the embodiment, since the factory air is used as the compressed air $F_0$, separate refrigerant or electric power is not necessary, and hence a decrease in cost may be realized. Furthermore, compared to the case where the factory air is directly ejected to the work piece W, the work piece W may be efficiently cooled. Then, since a liquid is not used as refrigerant, it is not necessary to perform dewatering work after the friction stir welding and it is possible to improve the efficiency of the work.

Next, a second embodiment will be described by referring to FIGS. 3 and 4. In the second embodiment, the same reference numerals are given to the same components as those of the first embodiment, and the description thereof will not be repeated.

Figure 3:
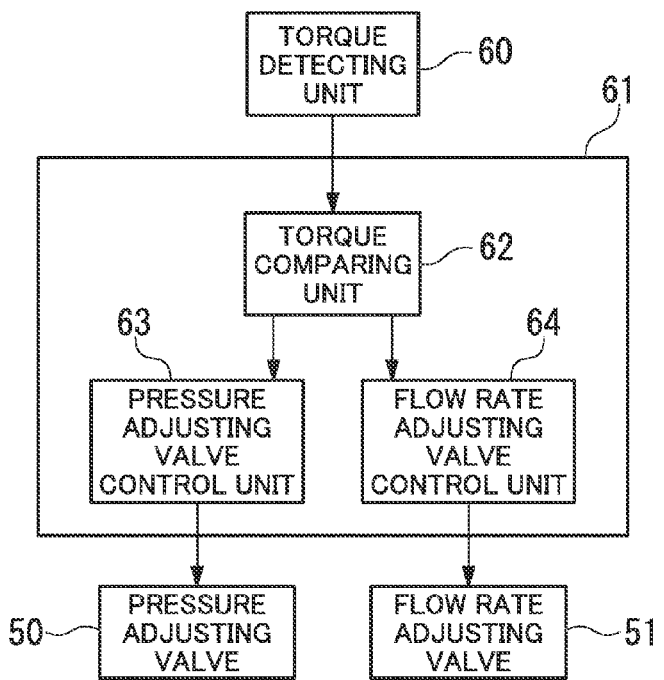
FIG. 3 is a block diagram illustrating a torque detecting unit, a first control device, a pressure control valve, and a flow rate adjusting valve of a friction stir welding apparatus according to a second embodiment of the present invention.
Figure 4:
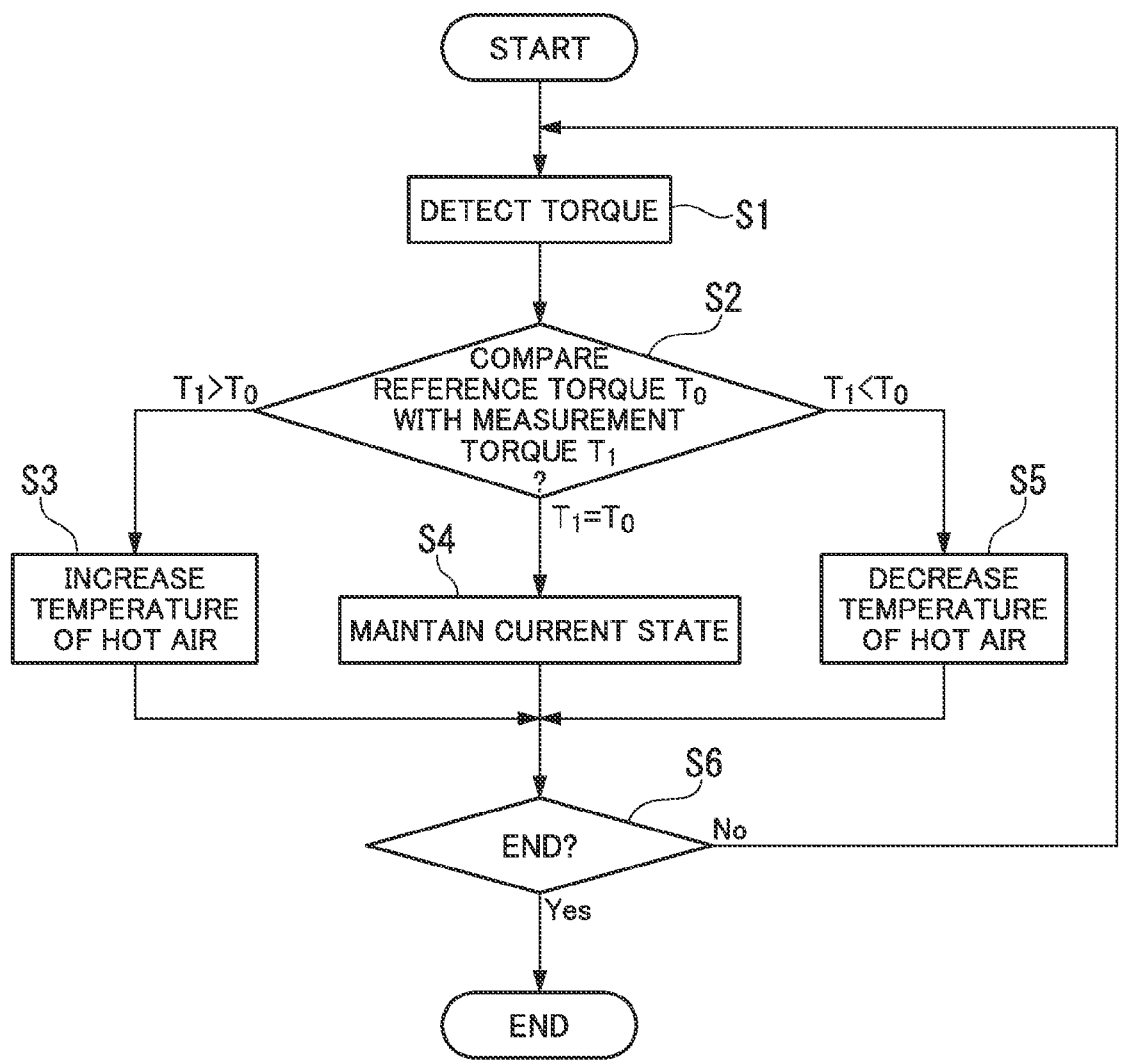
FIG. 4 is a flowchart illustrating the operation sequence of the torque detecting unit and the first control device of the friction stir welding apparatus according to the second embodiment of the present invention.

The friction stir welding apparatus 100 of the second embodiment is effective especially when the high-temperature strength of the work piece W is high, and includes a torque detecting unit 60 and a first control device 61 as shown in FIG. 3 in addition to the components of the first embodiment.

The torque detecting unit 60 serves to detect the rotational torque about the axis $O_1$ of the tool 30. In the embodiment, as the torque detecting unit 60, a voltage meter which measures the voltage value of the rotation motor driving the main shaft having the tool 30 connected thereto is adopted. That is, when the driving of the tool 30 is controlled so that the number of rotations becomes constant, the voltage value of the rotation motor is proportional to the rotational torque of the rotation motor (the rotational torque of the tool 30). Thus, it is possible to acquire the rotational torque of the tool 30 by converting the voltage value which is detected by the voltage meter as the torque detecting unit 60.

The first control device 61 includes a torque comparing unit 62 which is connected to the torque detecting unit 60 and a pressure adjusting valve control unit 63 and a flow rate adjusting valve control unit 64 which are connected to the torque comparing unit 62.

The torque comparing unit 62 receives a value of the rotational torque of the tool 30 detected by the torque detecting unit 60, that is, a measurement torque $T_1$. Then, the torque comparing unit 62 compares a predetermined reference torque $T_0$ with the measurement torque $T_1$, and outputs a command to each of the pressure adjusting valve control unit 63 and the flow rate adjusting valve control unit 64 in accordance with the magnitude relation between the reference torque $T_0$ and the measurement torque $T_1$.

In the embodiment, the value of the reference torque $T_0$ is converted into a voltage value, and is stored in the torque comparing unit 62. Then, the torque comparing unit 62 compares the magnitude relation between the reference torque $T_0$ and the measurement torque $T_1$ by comparing the voltage value corresponding to the reference torque $T_0$ and the voltage value corresponding to the measurement torque $T_1$ input from the torque detecting unit 60.

The pressure adjusting valve control unit 63 receives a command which is output from the torque comparing unit 62, and outputs a control command to the pressure adjusting valve 50 in accordance with the command. Based on the control command, the pressure adjusting valve 50 is controlled. As a result, the pressure of the compressed air $F_0$ which is supplied into the tube main body 41 is controlled.

The flow rate adjusting valve 51 receives a command which is output from the torque comparing unit 62, and outputs a control command to the flow rate adjusting valve 51 on the basis of the command. Based on the control command, the flow rate adjusting valve 51 is controlled. Accordingly, the flow rate of the hot air H which is ejected to the outside of the tube main body 41 as the hot air H and the flow rate of the cool air C which is ejected to the outside of the tube main body 41 while being reversed by the flow rate adjusting valve 51 are controlled.

Next, the operations of the vortex tube 40 and the first control device 61 of the friction stir welding apparatus 100 of the embodiment will be described in accordance with the flowchart shown in FIG. 4.

When the tool 30 rotates so as to start the friction stir welding of the work piece W using the friction stir welding apparatus 100, the rotational torque of the rotation motor which rotates the main shaft is detected by the torque detecting unit 60 (S1).

Next, when the measurement value of the rotational torque, that is, the measurement torque $T_1$ is input from the torque detecting unit 60 to the torque comparing unit 62, the torque comparing unit 62 compares the value of the measurement torque $T_1$ with the value of the reference torque $T_0$ which is a predetermined specified value (S2). As described above, in the embodiment, the measurement torque $T_1$ and the reference torque $T_0$ are both converted into voltage values and are compared with each other.

When the torque comparing unit 62 determines that the measurement torque $T_1$ is larger than the reference torque $T_0$, the torque detecting unit 60 outputs a hot air temperature rising command to each of the pressure adjusting valve control unit 63 and the flow rate adjusting valve control unit 64.

When the hot air temperature rising command is input, the pressure adjusting valve control unit 63 and the flow rate adjusting valve control unit 64 output a command to the pressure adjusting valve 50 and the flow rate adjusting valve 51 so that the temperature of the hot air H rises. That is, the pressure adjusting valve control unit 63 controls the pressure control valve so that the pressure of the compressed air $F_0$ supplied into the tube main body 41 rises. Accordingly, the difference in temperature between the hot air H and the cool air C is widened, so that the temperature of the hot air H rises. On the other hand, the flow rate adjusting valve 51 controls the flow rate adjusting valve 51 so that the flow rate of the hot air H discharged to the outside of the tube main body 41 becomes smaller. Accordingly, when the flow rate of the cool air C becomes larger, the difference in temperature between the hot air H and the cool air C is widened and the temperature of the hot air H rises (S3).

When the torque comparing unit 62 determines that the values of the measurement torque $T_1$ and the reference torque $T_0$ are equal to each other, the torque comparing unit 62 outputs a current state maintaining command to each of the pressure adjusting valve control unit 63 and the flow rate adjusting valve control unit 64.

When the current state maintaining command is input, the pressure adjusting valve control unit 63 and the flow rate adjusting valve control unit 64 do not output a command to the pressure adjusting valve 50 and the flow rate adjusting valve 51, so that the pressure adjusting valve 50 and the flow rate adjusting valve 51 are maintained in the current state (S4).

When the torque comparing unit 62 determines that the measurement torque $T_1$ is smaller than the reference torque $T_0$, the torque detecting unit 60 outputs a hot air temperature falling command to each of the pressure adjusting valve control unit 63 and the flow rate adjusting valve control unit 64.

When the hot air temperature falling command is input, the pressure adjusting valve control unit 63 and the flow rate adjusting valve control unit 64 outputs a command to the pressure adjusting valve 50 and the flow rate adjusting valve 51 so that the temperature of the hot air H falls. That is, the pressure adjusting valve control unit 63 controls the pressure control valve so that the pressure of the compressed air $F_0$ supplied into the tube main body 41 becomes smaller. Accordingly, the difference in temperature between the hot air H and the cool air C is narrowed, so that the temperature of the hot air H falls. On the other hand, the flow rate adjusting valve 51 controls the flow rate adjusting valve 51 so that the flow rate of the hot air H discharged to the outside of the tube main body 41 becomes larger. Accordingly, the flow rate of the cool air C becomes smaller, so that the difference in temperature between the hot air H and the cool air C is narrowed, and the temperature of the hot air H falls (S5).

Subsequently, when the friction stir welding is ended, the operations of the vortex tube 40 and the first control device 61 are ended (Yes in S6). On the other hand, when the friction stir welding is not ended, that is, the friction stir welding is continued (No in S6), the rotational torque is detected again by the torque detecting unit 60 (S1), and the above-described sequence is repeated.

According to the friction stir welding apparatus 100 of the second embodiment, it is possible to obtain the uniform welded state even when the high-temperature strength of the work piece W is high.

That is, when the rotational torque of the tool 30 is large, it is possible to further soften the work piece W at the front side of the movement direction D of the tool 30 by increasing the temperature of the hot air H which is supplied to the front side of the movement direction D of the tool 30. Accordingly, it is possible to reduce the rotational torque by reducing the load applied to the tool 30. On the other hand, when the rotational torque of the tool 30 is small, it is possible to prevent the work piece W at the front side of the movement direction D of the tool 30 from being excessively softened by reducing the temperature of the hot air H which is supplied to the front side of the movement direction D of the tool 30. Accordingly, it is possible to increase the rotational torque by increasing the load applied to the tool 30.

Accordingly, since it is possible to realize uniformity by suppressing a variation in rotational torque of the tool 30, it is possible to obtain the uniform welded state of the work piece W.

Next, a third embodiment will be described by referring to FIGS. 5 and 6. In the third embodiment, the same reference numerals are given to the same components as those of the second embodiment, and the description thereof will not be repeated.

Figure 5:
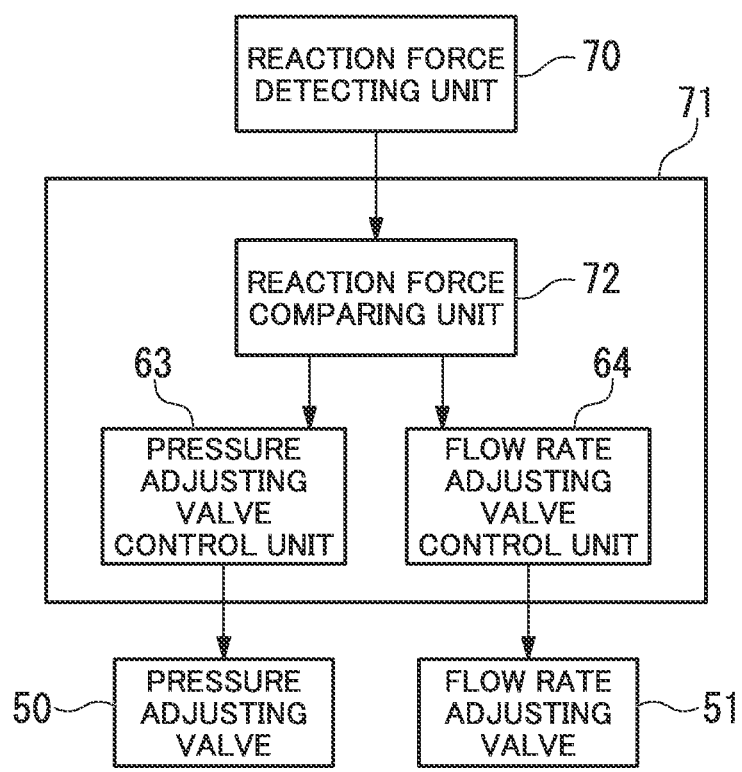
FIG. 5 is a block diagram illustrating a reaction force detecting unit, a second control device, a pressure control valve, and a flow rate adjusting valve of the friction stir welding apparatus according to a third embodiment of the present invention.
Figure 6:
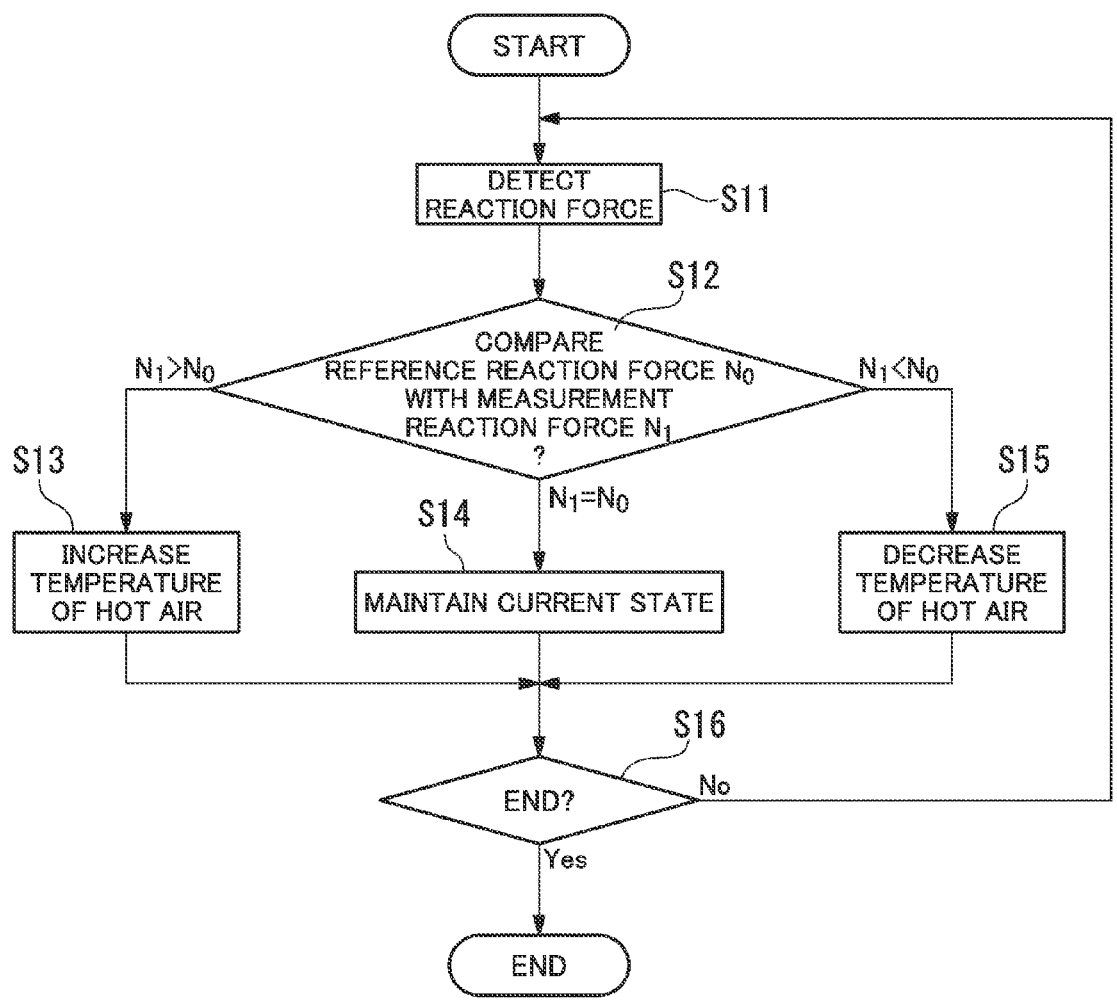
FIG. 6 is a flowchart illustrating the operation sequence of the reaction force detecting unit and the second control device of the friction stir welding apparatus according to the third embodiment of the present invention.

The friction stir welding apparatus 100 of the third embodiment is effective especially when the high-temperature strength of the work piece W is high, and includes a reaction force detecting unit 70 and a second control device 71 as shown in FIG. 5 instead of the torque detecting unit 60 and the first control device 61 of the second embodiment.

The reaction force detecting unit 70 serves to detect the tool reaction force exerted from the work piece W to the tool 30 in the direction along the axis $O_1$, that is, the tool reaction force exerted upward on the tool 30. In the embodiment, as the reaction force detecting unit 70, a current meter which measures the current value of the Z-axis motor driving the main shaft having the tool 30 connected thereto in the vertical direction is adopted.

That is, for example, when the tool reaction force is applied from the work piece W to the tool 30, the tool 30 is about to be displaced upward by the tool reaction force. Here, as described above, the Z-axis motor is feed-back controlled so that the shoulder surface 32 of the tool 30 is normally brought into contact with the surface of the work piece W. Thus, when the tool 30 is about to be displaced upward by the tool reaction force, the Z-axis motor is driven so that the tool 30 is returned to the initial position, that is, the position where the shoulder surface 32 is brought into contact with the surface of the work piece W. The driving of the Z-axis motor is performed by the control of the current value supplied to the Z-axis motor, and the current value becomes larger as the tool reaction force becomes larger. That is, the current value of the Z-axis motor is proportional to the tool reaction force. Thus, it is possible to acquire the tool reaction force of the tool 30 by converting the current value detected by the current meter as the reaction force detecting unit 70. Furthermore, the current value detected by the current meter as the reaction force detecting unit 70 may be an average value of a current which changes for a predetermined time.

The second control device 71 includes a reaction force comparing unit 72 which is connected to the reaction force detecting unit 70 and the pressure adjusting valve control unit 63 and the flow rate adjusting valve control unit 64 which are connected to the reaction force comparing unit 72.

The reaction force comparing unit 72 receives the tool reaction force which is detected by the reaction force detecting unit 70, that is, the measurement reaction force $N_1$. Then, the reaction force comparing unit 72 compares a predetermined reference reaction force $N_0$ with a measurement reaction force $N_1$, and outputs a command to each of the pressure adjusting valve control unit 63 and the flow rate adjusting valve control unit 64 in accordance with the magnitude relation between the reference reaction force $N_0$ and the measurement reaction force $N_1$.

In the embodiment, the value of the reference reaction force $N_0$ is converted into a current value and is stored in the reaction force comparing unit 72. Then, the reaction force comparing unit 72 compares the magnitude relation between the reference reaction force $N_0$ and the measurement reaction force $N_1$ by comparing the current value corresponding to the reference reaction force $N_0$ and the current value corresponding to the measurement reaction force $N_1$ which is input from the current meter as the reaction force detecting unit 70.

The pressure adjusting valve control unit 63 receives a command which is output from the reaction force comparing unit 72, and outputs a control command to the pressure adjusting valve 50 in accordance with the command. Based on the control command, the pressure adjusting valve 50 is controlled. As a result, the pressure of the compressed air $F_0$ supplied into the tube main body 41 is controlled.

The flow rate adjusting valve 51 receives a command which is output from the reaction force comparing unit 72, and outputs a control command to the flow rate adjusting valve 51 on the basis of the command. Based on the control command, the flow rate adjusting valve 51 is controlled.

Accordingly, the flow rate of the hot air H ejected to the outside of the tube main body 41 as the hot air H and the flow rate of the cool air C which is ejected to the outside of the tube main body 41 while being reversed by the flow rate adjusting valve 51 are controlled.

Next, the operations of the vortex tube 40 and the second control device 71 of the friction stir welding apparatus 100 of the embodiment will be described in accordance with the flowchart shown in FIG. 6.

When the tool 30 rotates so as to start the friction stir welding of the work piece W using the friction stir welding apparatus 100, the current value of the Z-axis motor which drives the main shaft in the vertical direction is detected by the reaction force detecting unit 70 (S11).

Subsequently, when the value of the measurement reaction force $N_1$ is input from the reaction force detecting unit 70 to the reaction force comparing unit 72, the reaction force comparing unit 72 compares the value of the measurement reaction force $N_1$ with the value of the predetermined reference reaction force $N_0$.

As described above, in the embodiment, the measurement reaction force $N_1$ and the reference reaction force $N_0$ are both converted into current values and are compared with each other.

When the reaction force comparing unit 72 determines that the measurement reaction force $N_1$ is larger than the reference reaction force $N_0$, the reaction force comparing unit 72 outputs a hot air temperature rising command to each of the pressure adjusting valve control unit 63 and the flow rate adjusting valve control unit 64.

When the hot air temperature rising command is input, the pressure adjusting valve control unit 63 and the flow rate adjusting valve control unit 64 output a command to the pressure adjusting valve 50 and the flow rate adjusting valve 51 so that the temperature of the hot air H rises. Accordingly, as in the second embodiment, the flow rate of the cool air C becomes larger, so that the difference in temperature between the hot air H and the cool air C is widened and the temperature of the hot air H rises (S13).

When the reaction force comparing unit 72 determines that the values of the measurement reaction force $N_1$ and the reference reaction force $N_0$ are equal to each other, the reaction force comparing unit 72 outputs a current state maintaining command to each of the pressure adjusting valve control unit 63 and the flow rate adjusting valve control unit 64, so that the pressure adjusting valve 50 and the flow rate adjusting valve 51 are maintained in the current state as in the second embodiment (S14).

When the reaction force comparing unit 72 determines that the measurement reaction force $N_1$ is smaller than the reference reaction force $N_0$, the reaction force comparing unit 72 outputs a hot air temperature falling command to each of the pressure adjusting valve control unit 63 and the flow rate adjusting valve control unit 64.

When the hot air temperature falling command is input, the pressure adjusting valve control unit 63 and the flow rate adjusting valve control unit 64 output a command to the pressure adjusting valve 50 and the flow rate adjusting valve 51 so that the temperature of the hot air H falls. Accordingly, as in the second embodiment, the flow rate of the cool air C becomes smaller, so that the difference in temperature between the hot air H and the cool air C is narrowed and the temperature of the hot air H falls (S15).

Then, when the friction stir welding is ended, the operations of the vortex tube 40 and the first control device 61 are also ended (Yes in S16). On the other hand, when the friction stir welding is not ended, that is, the friction stir welding is continued (No in S16), the tool reaction force is detected again by the reaction force detecting unit 70 (S11), and the above-described sequence is repeated.

According to the friction stir welding apparatus 100 of the third embodiment, it is possible to obtain the uniform welded state even when the high-temperature strength of the work piece W is high.

That is, when the tool reaction force is large, it is possible to further soften the work piece W at the front side of the movement direction D of the tool 30 by increasing the temperature of the hot air H which is supplied to the front side of the movement direction D of the tool 30. Accordingly, the rigidity of the work piece W reduces, so that the tool reaction force may reduce. On the other hand, when the tool reaction force is small, it is possible to prevent the work piece W at the front side of the movement direction D of the tool 30 from being excessively softened by decreasing the temperature of the hot air H which is supplied to the front side of the movement direction D of the tool 30. Accordingly, the rigidity of the work piece W is recovered, so that the tool reaction force may increase.

Thus, since it is possible to realize the uniformity by suppressing a variation in tool reaction force, it is possible to obtain the uniform welded state of the work piece W.

Figure 7:
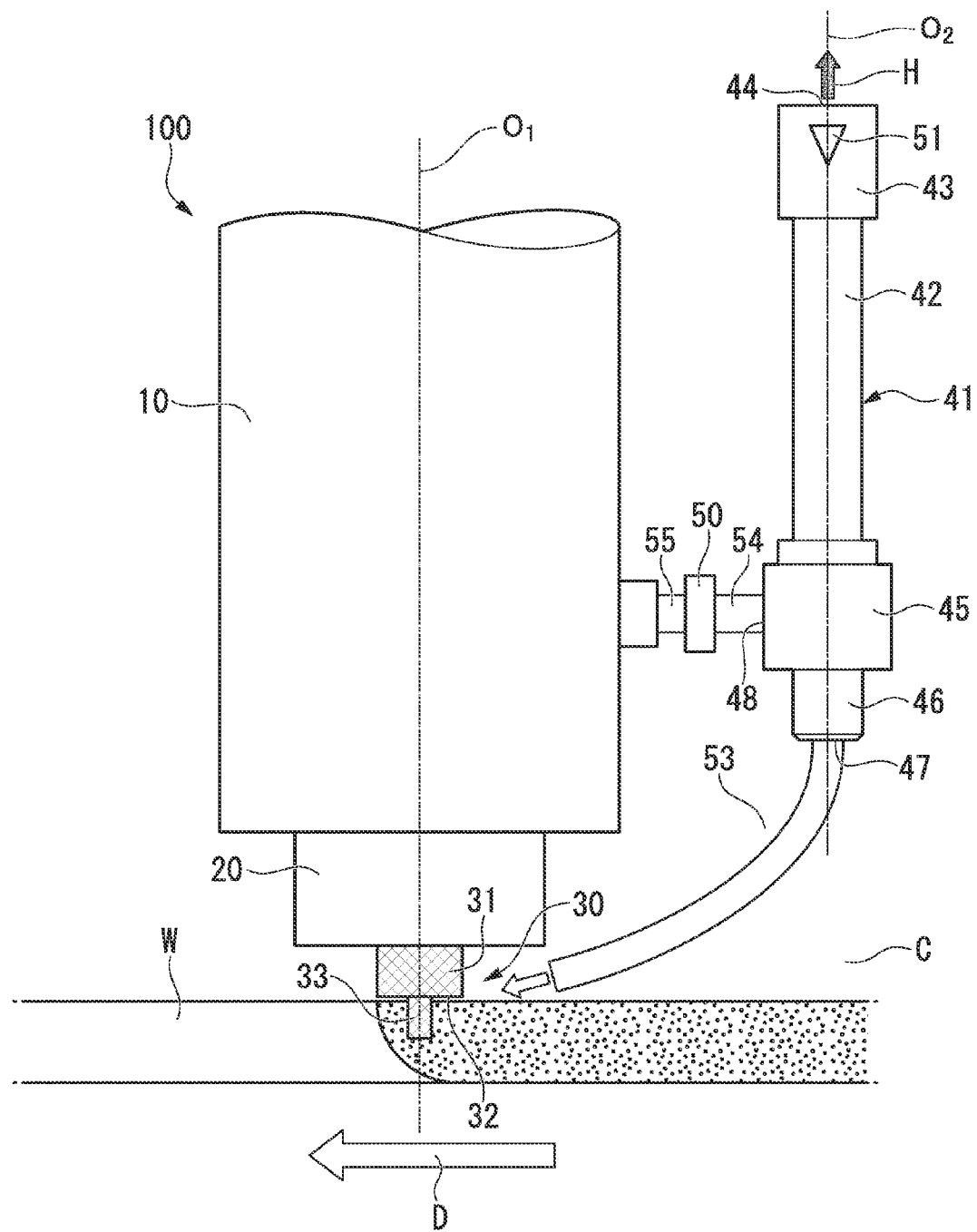
FIG. 7 is a side view illustrating the overall configuration of a friction stir welding apparatus according to a fourth embodiment of the present invention.

Next, a fourth embodiment will be described by referring to FIG. 7. In the fourth embodiment, the same reference numerals are given to the same components as those of the first embodiment, and the description thereof will not be repeated.

The friction stir welding apparatus 100 of the fourth embodiment is different from that of the first embodiment in that the arrangement method of the vortex tube 40 is different.

That is, the vortex tube 40 of the fourth embodiment is disposed above the work piece W with a gap between the vortex tube and the work piece W while the center line $O_2$ of the tube main body 41 is aligned with the vertical direction.

Further, the hot air ejection port 44 of the tube main body 41 is directed upward, and the cool air ejection port 47 is directed downward. Further, unlike the first embodiment, the hot air hose 52 is not provided, and the front end of the cool air hose 53 is directed toward the friction stir position of the tool 30 in the surface of the work piece W, that is, the welding portion.

When the friction stir welding is performed by the friction stir welding apparatus 100, the hot air H which is ejected from the hot air ejection port 44 of the vortex tube 40 is discharged upward into the atmosphere, and the cool air C which is ejected from the cool air ejection port 47 is supplied to the friction welding position in the surface of the work piece W through the cool air hose 53. Accordingly, since it is possible to remove the excessive heat in the friction stir welding position, it is possible to perform satisfactory welding.

Further, when the factory air is used as the compressed air $F_0$ as in the first embodiment, separate refrigerant or electric power is not needed. Accordingly, it is possible to realize a decrease in cost and efficiently cool the work piece W. Then, it is not necessary to perform dewatering work after the friction stir welding and it is possible to improve the efficiency of the work.

Next, a fifth embodiment will be described. In the fifth embodiment, the same reference numerals are given to the same components as those of the fourth embodiment and the other embodiments, and the description thereof will not be repeated.

The friction stir welding apparatus 100 of the fifth embodiment is effective especially when the high-temperature strength of the work piece W is low, and includes the torque detecting unit 60 and the first control device 61 as shown in FIG. 3 in addition to the components of the fourth embodiment.

Figure 8:
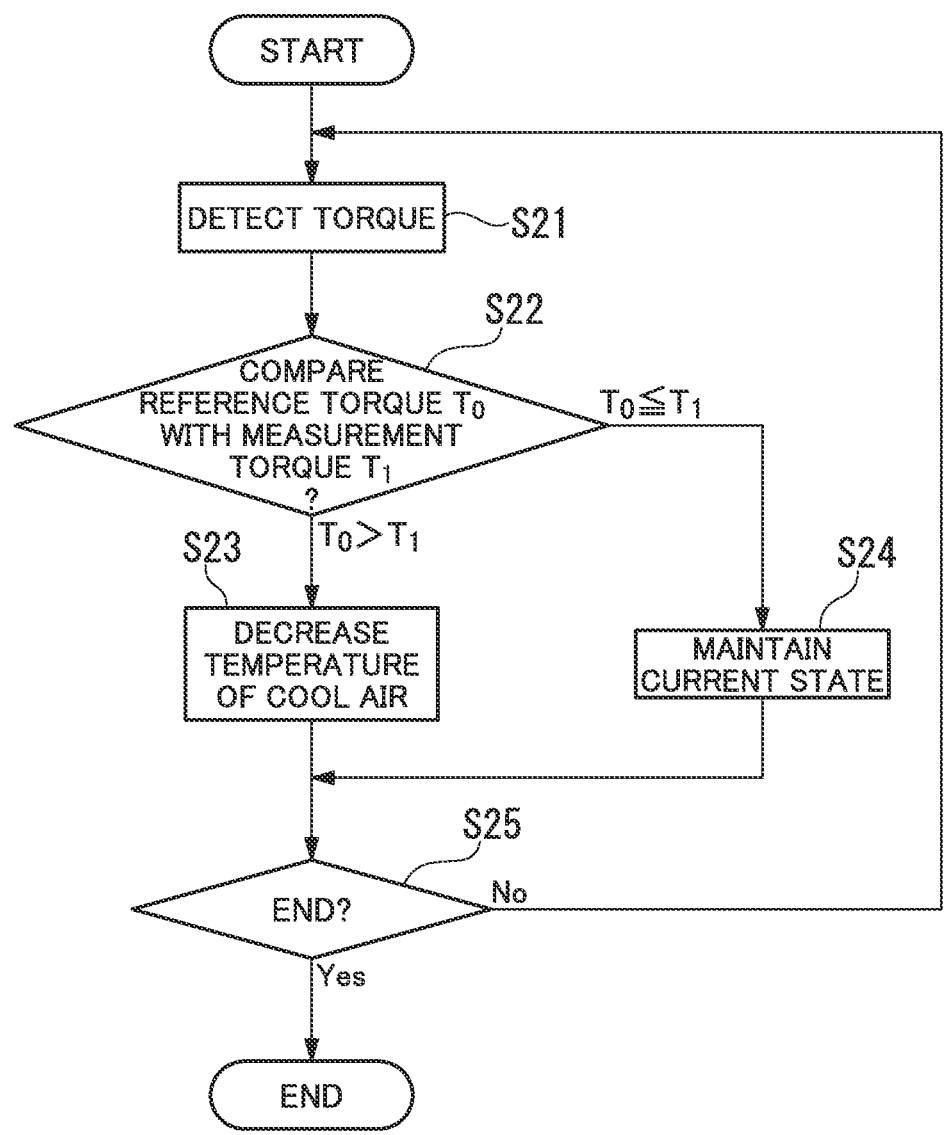
FIG. 8 is a flowchart illustrating the operation sequence of a torque detecting unit and a first control device of a friction stir welding apparatus according to a fifth embodiment of the present invention.

The operations of the vortex tube 40 and the first control device 61 will be described in accordance with the flowchart shown in FIG. 8.

When the tool 30 rotates so as to start the friction stir welding of the work piece W using the friction stir welding apparatus 100, the torque detecting unit 60 detects the rotational torque of the rotation motor which rotates the main shaft (S21).

Subsequently, when the measurement value of the rotational torque is input from the torque detecting unit 60 to the torque comparing unit 62, the torque comparing unit 62 compares the value of the measured rotational torque (the measurement torque $T_1$) with the value of the predetermined reference torque $T_0$ (S22).

When the torque comparing unit 62 determines that the value of the measurement torque $T_1$ is smaller than value of the reference torque $T_0$, the torque comparing unit 62 outputs a cool air temperature falling command to each of the pressure adjusting valve control unit 63 and the flow rate adjusting valve control unit 64.

When the cool air temperature falling command is input, the pressure adjusting valve control unit 63 and the flow rate adjusting valve control unit 64 output a command to the pressure adjusting valve 50 and the flow rate adjusting valve 51 so that the temperature of the cool air C falls. That is, the pressure adjusting valve control unit 63 controls the pressure control valve so that the pressure of the compressed air $F_0$ supplied into the tube main body 41 increases. Accordingly, the difference in temperature between the hot air H and the cool air C is widened, so that the temperature of the cool air C falls. On the other hand, the flow rate adjusting valve 51 controls the flow rate adjusting valve 51 so that the flow rate of the hot air H which is discharged to the outside of the tube main body 41 becomes larger. Accordingly, the flow rate of the cool air C becomes smaller, so that the difference in temperature between the hot air H and the cool air C is narrowed and the temperature of the cool air C falls (S23).

When the torque comparing unit 62 determines that the value of the measurement torque $T_1$ is equal to or larger than the value of the reference torque $T_0$, the torque comparing unit 62 outputs a current state maintaining command to each of the pressure adjusting valve control unit 63 and the flow rate adjusting valve control unit 64.

When the current state maintaining command is input, the pressure adjusting valve control unit 63 and the flow rate adjusting valve control unit 64 do not output a command to the pressure adjusting valve 50 and the flow rate adjusting valve 51, and the pressure adjusting valve 50 and the flow rate adjusting valve 51 are maintained in the current state (S24).

Then, when the friction stir welding is ended, the operations of the vortex tube 40 and the first control device 61 are also ended (Yes in S25). On the other hand, when the friction stir welding is not ended, that is, the friction stir welding is continued (No in S25), the rotational torque is detected again by the torque detecting unit 60 (S21), and the above-described sequence is repeated.

According to the friction stir welding apparatus 100 of the fifth embodiment, even when the high-temperature strength of the work piece W is low, it is possible to prevent the welding portion from being excessively softened and prevent a defect from being caused by excessive stirring at the welding portion.

That is, when the rotational torque of the tool 30 is too small, the stirring of the welding portion is excessively performed by the shaft portion 33. However, in the embodiment, since the temperature of the cool air C which is supplied to the friction stirring position in this case falls, it is possible to prevent the welding portion of the work piece W from being excessively softened due to the friction heat.

Next, a sixth embodiment will be described. In the sixth embodiment, the same reference numerals are given to the same components as those of the fourth embodiment and the other embodiments, and the description thereof will not be repeated here.

The friction stir welding apparatus 100 of the sixth embodiment is effective especially when the high-temperature strength of the work piece W is low, and includes the reaction force detecting unit 70 and the second control device 71 as shown in FIG. 5 in addition to the components of the fourth embodiment.

Figure 9:
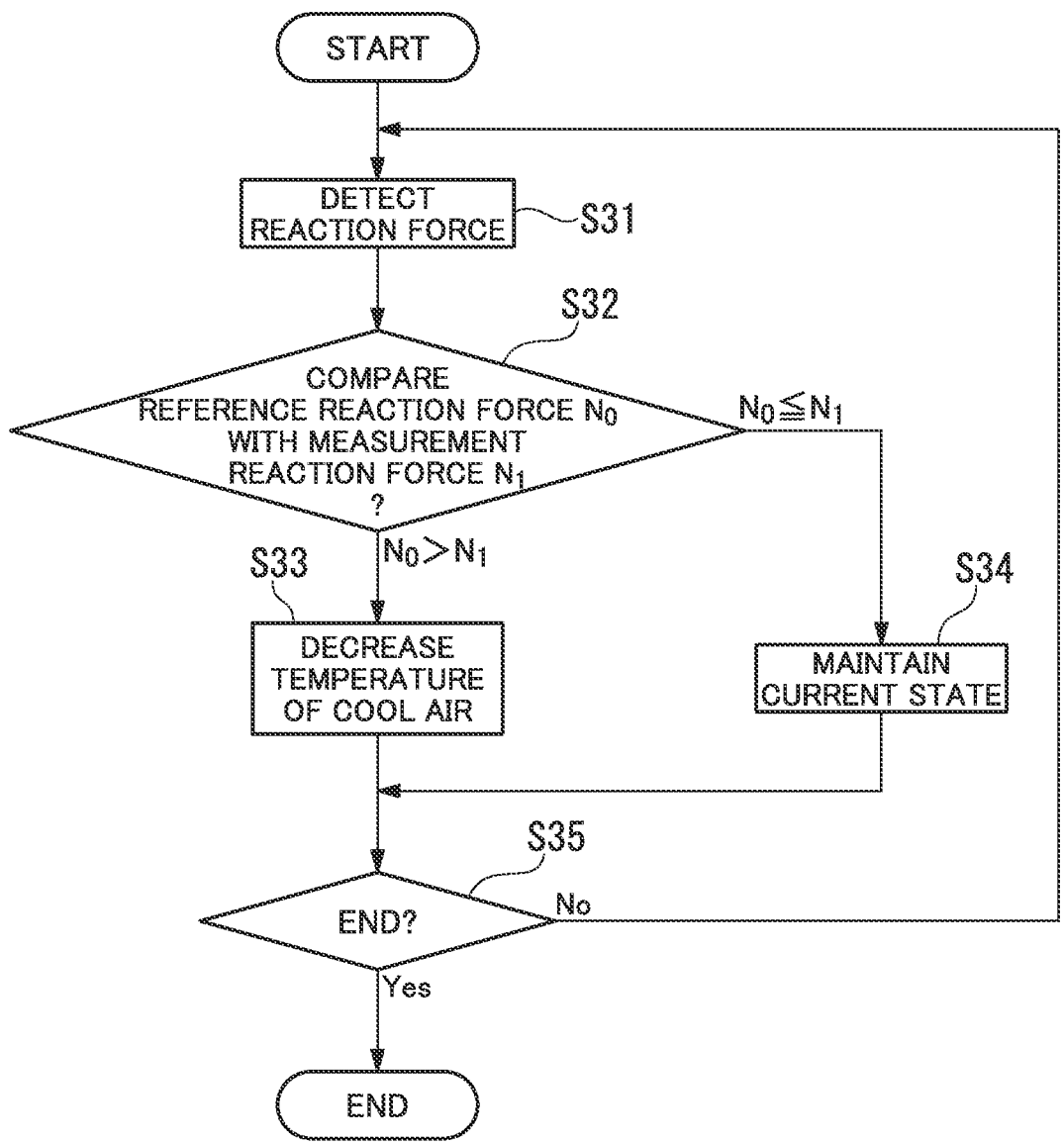
FIG. 9 is a block diagram illustrating a reaction force detecting unit, a second control device, a pressure control valve, and a flow rate adjusting valve of a friction stir welding apparatus according to a sixth embodiment of the present invention.

The operations of the vortex tube 40 and the second control device 71 will be described in accordance with the flowchart shown in FIG. 9.

When the tool 30 rotates so as to start the friction stir welding of the work piece W using the friction stir welding apparatus 100, the reaction force detecting unit 70 detects the current value of the Z-axis motor which drives the main shaft in the vertical direction (S31).

Subsequently, when the current value is input from the reaction force detecting unit 70 to the reaction force comparing unit 72, the reaction force comparing unit 72 compares the value of the measurement reaction force $N_1$ with the value of the predetermined reference reaction force $N_0$.

When the reaction force comparing unit 72 determines that the value of the measurement reaction force $N_1$ is smaller than the value of the reference reaction force $N_0$, the reaction force comparing unit 72 outputs a cool air temperature falling command to each of the pressure adjusting valve control unit 63 and the flow rate adjusting valve control unit 64.

When the cool air temperature falling command is input, the pressure adjusting valve control unit 63 and the flow rate adjusting valve control unit 64 output a command to the pressure adjusting valve 50 and the flow rate adjusting valve 51 so that the temperature of the cool air C falls. Accordingly, as in the fifth embodiment, the flow rate of the cool air C becomes smaller, so that the difference in temperature between the hot air H and the cool air C is narrowed and the temperature of the cool air C falls (S33).

When the reaction force comparing unit 72 determines that the value of the measurement reaction force $N_1$ is equal to or larger than the value of the reference reaction force $N_0$, the reaction force comparing unit 72 outputs a current state maintaining command to each of the pressure adjusting valve control unit 63 and the flow rate adjusting valve control unit 64.

When the current state maintaining command is input, the pressure adjusting valve control unit 63 and the flow rate adjusting valve control unit 64 do not output a command to the pressure adjusting valve 50 and the flow rate adjusting valve 51, and the pressure adjusting valve 50 and the flow rate adjusting valve 51 are maintained in the current state (S34).

Subsequently, when the friction stir welding is ended, the operations of the vortex tube 40 and the second control device 71 are also ended (Yes in S35). On the other hand, when the friction stir welding is not ended, that is, the friction stir welding is continued (No in S35), the tool reaction force is detected again by the reaction force detecting unit 70 (S31), and the above-described sequence is repeated.

According to the friction stir welding apparatus 100 of the sixth embodiment, as in the fifth embodiment, even when the high-temperature strength of the work piece W is low, it is possible to prevent the welding portion from being excessively softened and prevent a defect from being caused by excessive stirring at the welding portion.

That is, when the tool reaction force is too small, the stirring of the welding portion is excessively performed by the shaft portion 33 since the work piece W is excessively softened. However, in the embodiment, since the temperature of the cool air C which is supplied to the friction stirring position in this case falls, it is possible to prevent the welding portion of the work piece W from being excessively softened due to the friction heat.

While the embodiments of the present invention have been described in detail, the present invention is not limited thereto, and the design and the like may be slightly changed without departing from the technical spirit thereof.

For example, in the embodiment, the tool 30 of which the shaft portion 33 protrudes from the lower end of the shoulder portion 31 has been described. However, a so-called bobbin type tool 30 may be used which includes a pair of shoulder portions 31 interposing the work piece W from the upside and the downside and the shaft portion 33 connected to the shoulder portions 31.

Further, in the friction stir welding of the first embodiment, the front end of the hot air hose 52 may be obliquely directed downward at the front side of the movement direction D of the tool 30, and the front end of the cool air hose 53 may be obliquely directed downward at the rear side of the movement direction D of the tool 30. Accordingly, since it is possible to prevent the hot air H ejected from the hot air hose 52 and the cool air C ejected from the cool air hose 53 from being mixed with each other, it is possible to reliably obtain the heating effect using the hot air H and the cooling effect using the cool air C.

Furthermore, in the second, third, fifth, and sixth embodiments, an example has been described in which the first control device 61 and the second control device 71 are respectively provided with both the pressure adjusting valve control unit 63 and the flow rate adjusting valve control unit 64, but any one of the pressure adjusting valve control unit 63 and the flow rate adjusting valve control unit 64 may be provided therein. In this case, any one of the pressure adjusting valve control unit 63 or the flow rate adjusting valve control unit 64 controls the pressure adjusting valve 50 or the flow rate adjusting valve 51 on the basis of the detection result of the rotational torque or the tool reaction force. Accordingly, it is possible to obtain the uniform welded state as in the embodiments and prevent a defect from being caused by the excessive stirring.

Further, for example, a temperature detecting unit which detects the temperature of the surface of the work piece W may be provided, and a control device may be separately provided so as to control the pressure adjusting valve 50 and the flow rate adjusting valve 51 on the basis of the detection result of the temperature detecting unit.

When the temperature detecting unit and the control device are applied to the first embodiment, the temperature of the hot air H is adjusted in a manner such that the temperature detecting unit measures the temperature at the front side of the movement direction D of the tool 30 in the surface of the work piece W and the control device controls at least one of the pressure adjusting valve control unit 63 and the flow rate adjusting valve control unit 64 on the basis of the temperature. Accordingly, it is possible to appropriately pre-heat the work piece W.

Further, when the temperature detecting unit and the control device are applied to the fourth embodiment, the temperature of the cool air C is adjusted in a manner such that the temperature detecting unit measures the temperature at the friction stirring position in the work piece W and the control device controls at least one of the pressure adjusting valve control unit 63 and the flow rate adjusting valve control unit 64 on the basis of the temperature. Accordingly, it is possible to prevent the welding position from being excessively softened.

Furthermore, in the embodiments, the voltage meter which detects the voltage value of the rotation motor of the main shaft is adopted as the torque detecting unit 60 which detects the rotational torque of the tool 30, but the present invention is not limited thereto. That is, any means may be used as long as the torque of the tool 30 may be detected. For example, as the torque detecting unit 60, various types, such as a slip ring type or a strain gauge type, of instruments may be adopted.

Furthermore, in the embodiments, as the reaction force detecting unit 70 which detects the tool reaction force, the current meter which detects the current value of the Z-axis motor of the main shaft is adopted, but the present invention is not limited thereto. Any means may be used as long as the tool reaction force may be detected. For example, as the reaction force detecting unit 70, load measurement means such as a load cell may be adopted.

The configuration of the vortex tube 40 is not limited to the embodiments, and any configuration may be used as long as the compressed air $F_0$ may be separated into the hot air H and the cool air C on the basis of the so-called vortex theory.

In the embodiments, an example has been described in which the welding end surface of the work piece W is welded along the extension direction of the welding end surface, but the friction stir welding apparatus 100 may be used for local welding, such as, for example, spot welding.

While preferred embodiments of the present invention have been described and illustrated above, it should be understood that these are exemplary of the present invention and are not to be considered as limiting. Additions, omissions, substitutions, and other modifications can be made without departing from the spirit or scope of the present invention. Accordingly, the present invention is not to be considered as being limited by the foregoing description, and is only limited by the scope of the appended claims.

What is claimed is:

1. A friction stir welding apparatus which performs friction stir welding on a work piece by bringing a tool into contact with a surface of the work piece and rotating the tool about the longitudinal axis of the tool and moving the tool relative to the work piece, the friction stir welding apparatus comprising:
    a main body for holding the tool such that the main body moves with the tool relative to the work piece;
    a hot air and cool air separating unit disposed at the main body and which separates a supplied gas into hot air hotter than the gas and cool air cooler than the gas in a tube portion and ejects the cool air from a first end of the tube portion and ejects hot air from a second end of the tube portion;
    a cool air passage extending from the first end of the tube portion for conveying the cool air in a direction from the main body toward the work piece; and
    a hot air passage extending from the second end of the tube portion for conveying the hot air in a direction from the main body toward the work piece,
    wherein the hot air passage has a hot air opening at a front end of the hot air passage, the hot air opening being disposed on a front side of the main body and arranged to direct the hot air to the surface of the workpiece,
    wherein the cool air passage has a cool air opening at a front end of the cool air passage, the cool air opening being disposed on a rear side of the main body and arranged to direct the cool air to the surface of the workpiece, and wherein the front side of the main body and the rear side of the main body are opposed to each other in a lateral direction perpendicular to the longitudinal axis of the tool, and the hot air opening is disposed on an opposite side of the main body from the cool air opening in the lateral direction.

2. The friction stir welding apparatus of claim 1, wherein the hot air and cool air separating unit includes a vortex flow generating portion which is connected to the first end of the tube portion and rotates the gas supplied from the outside in a vortex shape so as to be sent to the second end side inside the tube portion, a cool air ejection port capable of ejecting the cool air at the first end of the tube portion, a hot air ejection port capable of ejecting the hot air at the second end of the tube portion, a pressure adjusting valve which is capable of adjusting the pressure of the gas supplied into the vortex flow generating portion, and a flow rate adjusting valve which is capable of adjusting the flow rate of the hot air ejected from the hot air ejection port.

3. The friction stir welding apparatus of claim 2, further comprising:

a torque detecting unit which detects a rotational torque about the axis of the tool; and a first control device which controls at least one of the pressure adjusting valve and the flow rate adjusting valve on the basis of the value of the rotational torque detected by the torque detecting unit.

4. The friction stir welding apparatus of claim 3, further comprising:

a reaction force detecting unit which detects a tool reaction force in the direction along the axis and exerted on the tool from the work piece; and a second control device which controls at least one of the pressure adjusting valve and the flow rate adjusting valve on the basis of the value of the tool reaction force detected by the reaction force detecting unit.

5. The friction stir welding apparatus of claim 2, further comprising:

a reaction force detecting unit which detects a tool reaction force in the direction along the axis and exerted on the tool from the work piece; and a control device which controls at least one of the pressure adjusting valve and the flow rate adjusting valve on the basis of the value of the tool reaction force detected by the reaction force detecting unit.

6. A friction stir welding apparatus which performs friction stir welding on a work piece by bringing a tool into contact with a surface of the work piece and rotating the tool about the longitudinal axis of the tool and moving the tool relative to the work piece, the friction stir welding apparatus comprising:

a main body for holding the tool such that a longitudinal axis of the main body is parallel to the longitudinal axis of the tool and the main body moves with the tool relative to the work piece;

a hot air and cool air separating unit disposed at the main body and which separates a supplied gas into hot air hotter than the gas and cool air cooler than the gas in a tube portion and ejects the cool air from a first end of the tube portion and ejects hot air from a second end of the tube portion, the tube portion being connected to the main body such that the tube portion and the main body move together in a movement direction relative to the work piece;

a cool air passage extending from the first end of the tube portion for conveying the cool air in a direction from the main body toward the work piece; and a hot air passage extending from the second end of the tube portion for conveying the hot air in a direction from the main body toward the work piece;

wherein the hot air passage has a hot air opening, the hot air opening being disposed on a front side of the main body and arranged to direct the hot air to the surface of the workpiece at the front side of the main body, wherein the cool air passage has a cool air opening, the cool air opening being disposed on a rear side of the main body and arranged to direct the cool air to the surface of the workpiece at the rear side of the main body, and wherein the front side of the main body and the rear side of the main body are opposed to each other in a lateral direction perpendicular to the longitudinal axis of the main body, and the hot air opening is disposed on an opposite side of the main body from the cool air opening in the lateral direction.

7. The friction stir welding apparatus of claim 6, wherein the hot air and cool air separating unit includes a vortex flow generating portion which is connected to the first end of the tube portion and rotates the gas supplied from the outside in a vortex shape so as to be sent to the second end side inside the tube portion, a cool air ejection port capable of ejecting the cool air at the first end of the tube portion, a hot air ejection port capable of ejecting the hot air at the second end of the tube portion, a pressure adjusting valve which is capable of adjusting the pressure of the gas supplied into the vortex flow generating portion, and a flow rate adjusting valve which is capable of adjusting the flow rate of the hot air ejected from the hot air ejection port.

8. The friction stir welding apparatus of claim 7, further comprising:

a torque detecting unit which detects a rotational torque about the axis of the tool; and a first control device which controls at least one of the pressure adjusting valve and the flow rate adjusting valve on the basis of the value of the rotational torque detected by the torque detecting unit.

9. The friction stir welding apparatus of claim 8, further comprising:

a reaction force detecting unit which detects a tool reaction force in the direction along the axis and exerted on the tool from the work piece; and a second control device which controls at least one of the pressure adjusting valve and the flow rate adjusting valve on the basis of the value of the tool reaction force detected by the reaction force detecting unit.

10. The friction stir welding apparatus of claim 7, further comprising:

a reaction force detecting unit which detects a tool reaction force in the direction along the axis and exerted on the tool from the work piece; and a control device which controls at least one of the pressure adjusting valve and the flow rate adjusting valve on the basis of the value of the tool reaction force detected by the reaction force detecting unit.

* * * * *